United States Patent [19]
Meisinger et al.

[11] Patent Number: 6,050,295
[45] Date of Patent: Apr. 18, 2000

[54] HIGH FLOW VALVED FITTING

[75] Inventors: Stanlee W. Meisinger, Golden Valley; Mark D. Medved, Stillwater, both of Minn.

[73] Assignee: FasTest, Inc., St. Paul, Minn.

[21] Appl. No.: 09/090,278

[22] Filed: Jun. 4, 1998

[51] Int. Cl.[7] ................................................. F16K 15/00
[52] U.S. Cl. .............................................. 137/541; 137/543
[58] Field of Search .................................... 137/542, 543, 137/541, 538, 232, 234.5

[56] References Cited

U.S. PATENT DOCUMENTS

| | | | |
|---|---|---|---|
| 2,006,712 | 7/1935 | Forbes et al. . | |
| 2,170,478 | 8/1939 | Long et al. | 137/542 |
| 2,524,951 | 10/1950 | Ashton | 137/542 |
| 2,594,641 | 4/1952 | Griffith et al. | 137/543 |
| 2,645,451 | 7/1953 | Gladden . | |
| 2,928,417 | 3/1960 | Buckner et al. | 137/541 |
| 3,083,723 | 4/1963 | Duchin | 137/543 |
| 3,419,040 | 12/1968 | Thibodeaux | 137/543 |
| 3,756,273 | 9/1973 | Hengesbach | 137/541 |
| 3,800,824 | 4/1974 | Medina | 137/543 |
| 3,916,947 | 11/1975 | Holmes et al. . | |
| 3,995,658 | 12/1976 | Hager | 137/543 |
| 4,026,320 | 5/1977 | Grahl . | |
| 4,506,695 | 3/1985 | Kuypers | 137/543 |
| 4,644,973 | 2/1987 | Itoh et al. . | |
| 4,979,721 | 12/1990 | Gilbert | 137/543 |
| 5,067,521 | 11/1991 | Jenks et al. . | |
| 5,139,049 | 8/1992 | Jensen et al. . | |
| 5,396,774 | 3/1995 | Hubbell, Jr. . | |

FOREIGN PATENT DOCUMENTS 1 512 786  4/1968  France .

OTHER PUBLICATIONS

A photograph of a valve arrangement produced and sold by Schrader–Bridgeport Corporation of Deerfield, Illinois.

*Primary Examiner*—Henry Bennett
*Assistant Examiner*—Joanne Y. Kim
*Attorney, Agent, or Firm*—Merchant & Gould P.C.

[57] ABSTRACT

A valved fitting is provided which includes a body having a first end and a second end spaced from the first end, with a fluid passage extending through the body between the first and second ends. A valve seat is defined on the body within the fluid passage, and a valve assembly is removably disposed within the fluid passage for controlling flow through the fluid passage. The valve assembly includes a valve head that is engageable with the valve seat in sealable relation therewith. A higher flow area, and thus a higher flow rate, are achieved with the fitting of the invention as compared to conventional fittings which utilize a single-piece body with a Schrader valve, because the valve seat is defined on the body, and the valve head is engageable with the valve seat. Further, the valve assembly is removable, thereby allowing the valve assembly to be replaced when needed. The valved fitting of the invention is particularly useful on a service valve block for an air conditioning system.

21 Claims, 7 Drawing Sheets

Fig. 1
PRIOR ART
Fig. 2
PRIOR ART
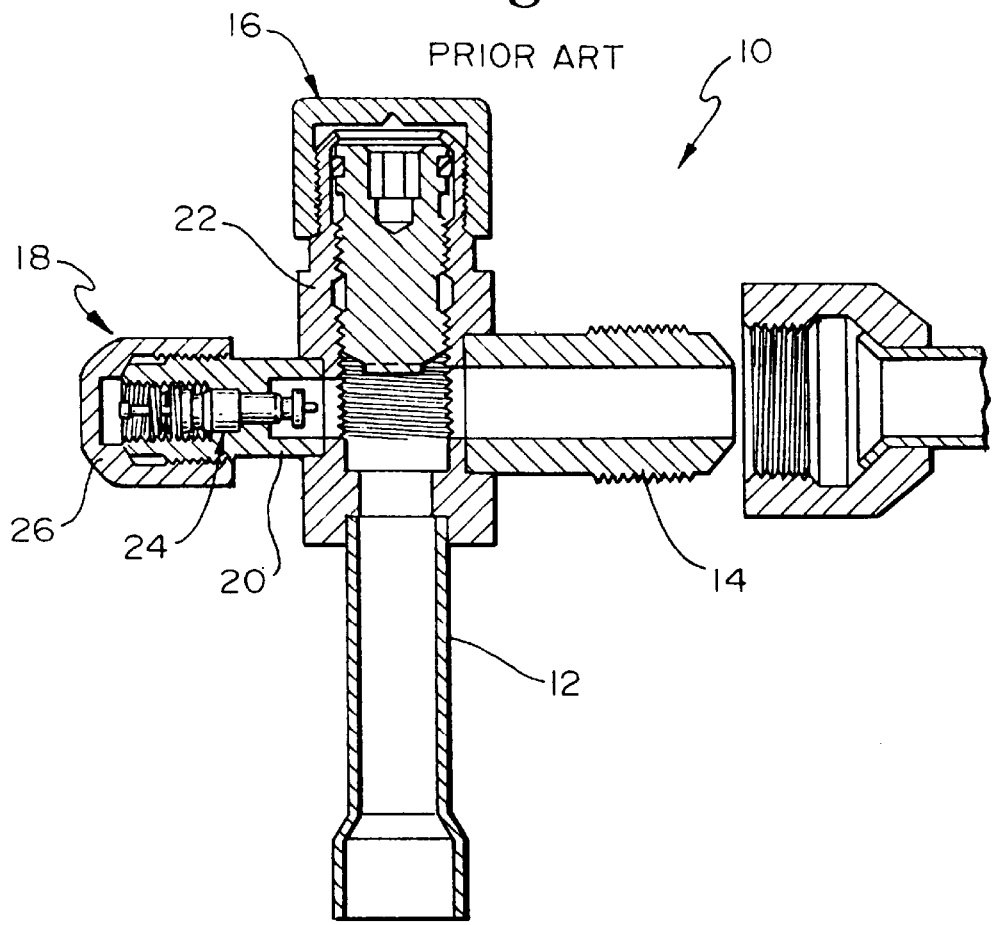
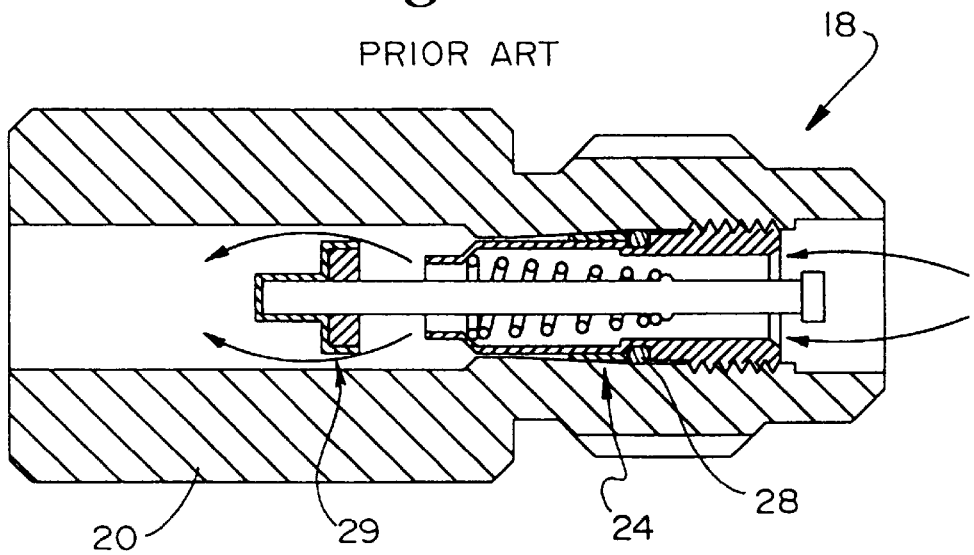

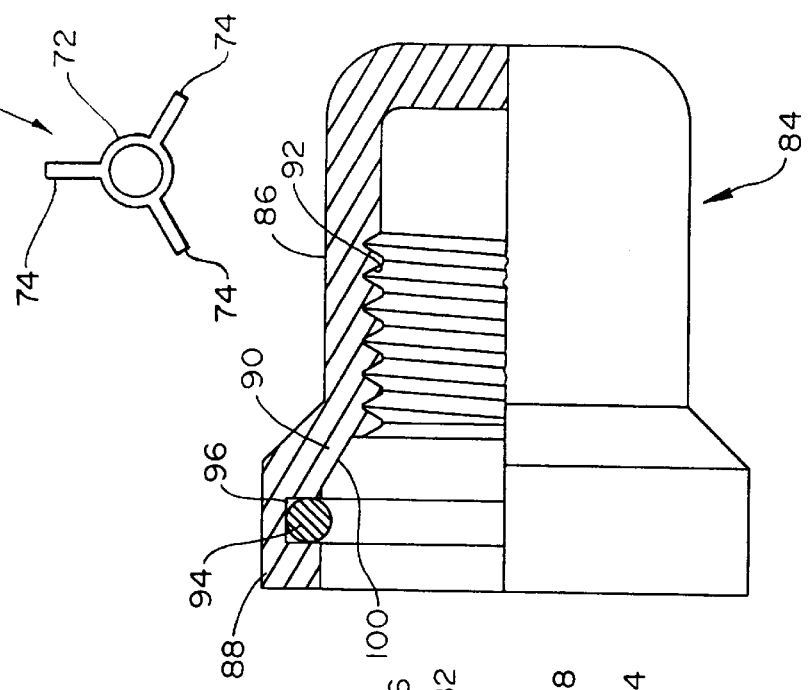
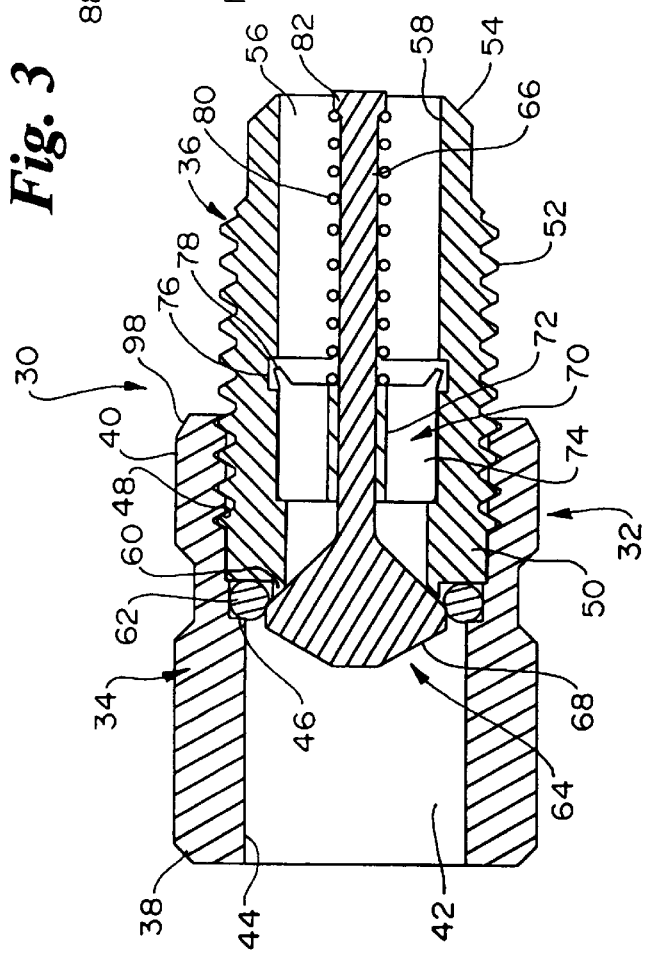
Fig. 3A
Fig. 3

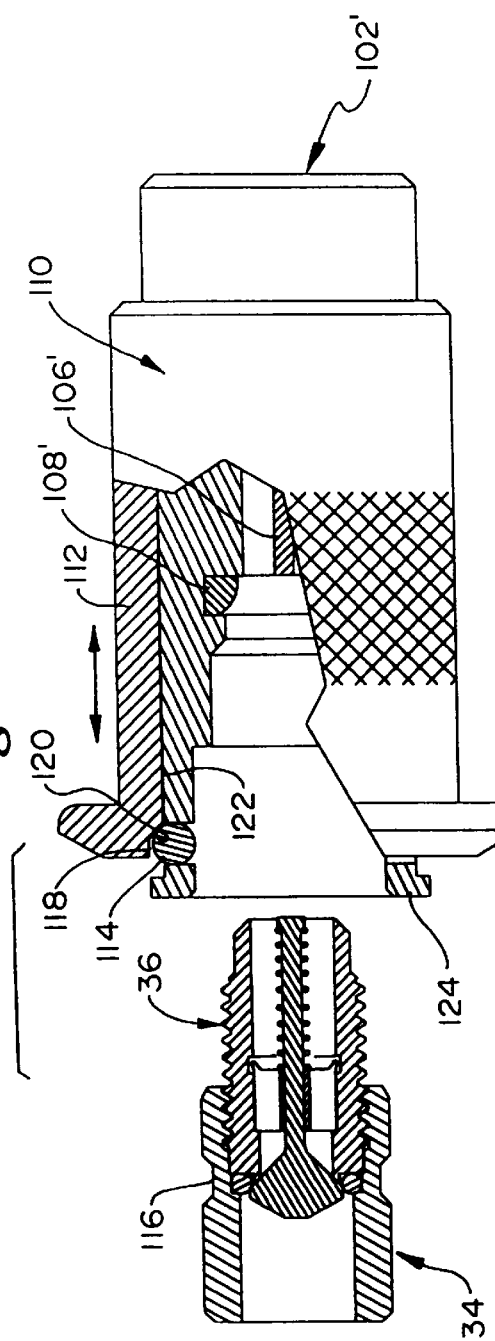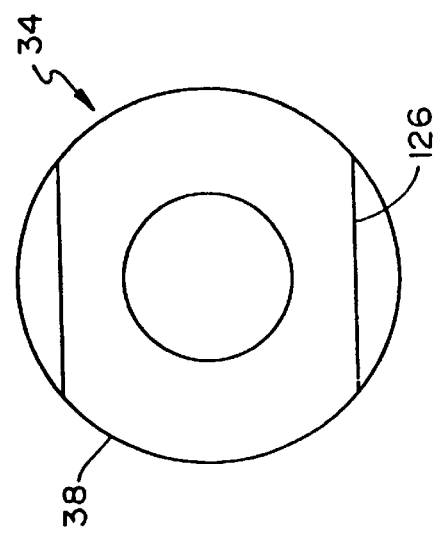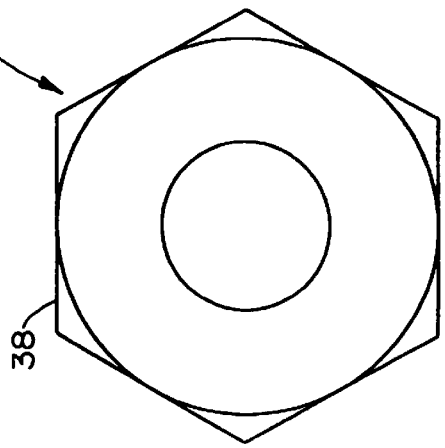

HIGH FLOW VALVED FITTING

FIELD OF THE INVENTION

The present invention relates generally to valved fittings on service valve blocks of air conditioning units. More particularly, the present invention relates to a valved fitting that allows a high flow and quick connection to a fluid conduit.

BACKGROUND OF THE INVENTION

It is common in refrigeration systems, such as air conditioning units, to employ a service valve block in the suction line between the evaporator and compressor, and between the condenser and the evaporator. These service valve blocks typically include inlet and outlet conduits, a shutoff valve fitting controlling flow between the inlet and outlet conduits, and a charging/evacuation fitting to permit charging, evacuation and/or testing of the system.

A typical service valve block 10 is illustrated in FIG. 1, and includes a conduit 12 which can be connected to, for instance, the compressor, and a conduit 14 which can be connected to the evaporator, and a shut-off valve fitting 16 for controlling flow between the conduits 12,14. The service block 10 further includes a charging/evacuation fitting 18 to permit charging, evacuation, and testing of the system with which the service block is used.

As can be seen in FIGS. 1 and 2, the fitting 18 includes a body 20 having one end fixed to a housing 22 of the service block 10, and having an interior flow passage communicating with the interior of the housing. A Schrader valve assembly 24 is removably secured within the body 20, such as by threading, for controlling flow through the body 20. The exterior surface of the body 20 is threaded to permit connection of a closure cap 26 thereto when the fitting 18 is not in use, and to permit connection to an internally threaded fluid line when the cap 26 is removed to allow introduction or removal of fluids from the system through the fluid line. The Schrader valve assembly 24 includes a valve housing 28 through which the fluid flows, and which is externally threaded so that the valve assembly can be replaced when needed by simply unscrewing the valve assembly from the body and replacing the defective valve assembly with a new valve assembly. A spring biased valve stem and valve head 29 are provided within the housing for controlling flow therethrough. The valve head 29, which has a seal thereon and which is normally biased into sealed engagement with the housing 28 to prevent flow through the body 20, is actuated away from housing 28 by the valve stem in order to allow fluid to flow through the body.

Although the fitting 18 is generally adequate to permit the introduction and/or removal of fluids from the system, the flow area and thus flow rate provided by the fitting 18 is limited. In particular, the fluid must flow through the relatively small area of the housing 28, which restricts the amount of flow that can flow through the fitting. While it would be possible to increase the size of the housing 28 as well as increasing the size of the flow passage of the body 20, such increases are limited by mechanical constraints, as well as the fact that the size of valve fitting bodies are generally standardized to allow interchangeable use of valve fittings 18 on service valve blocks 10. Further, the seal on the valve head of the Schrader valve increases the size of the valve head 29 and thereby reduces the amount of fluid flow through the fitting 18. Further, while the threads on the exterior surface of the body 20 permit connection with a fluid line, the fluid line must be threaded onto the body, which can be difficult and time consuming, as well as leaving open the possibility of damaging the threads on the body which could require that the fitting be replaced.

What is needed then is an improved valved fitting for use on a service valve block which has a higher flow area, and thus higher flow rate, than conventional fittings with Schrader valve assemblies, and which is designed to permit fast and easy connection with a fluid line, while retaining many of the features of conventional fittings, such as the ability to replace the valve assembly.

SUMMARY OF THE INVENTION

The invention provides an improved valved fitting, particularly for use on a service valve block in an air conditioning system and the like to permit charging, evacuation and/or testing, having a flow area, and thus flow rate, that is greater than conventional valved fittings. The valved fitting of the invention preferably provides a flow area greater than about three times the flow area of a conventional fitting with a Schrader valve assembly. More preferably, the flow area of the invention is about three to about five times greater than the flow area of a conventional fitting with a Schrader valve assembly. Most preferably, the flow area of the invention is about four times greater than the flow area of a conventional fitting with a Schrader valve assembly.

The valved fitting is designed to be connected with a fluid line by either threading or with a latching connector. The valved fitting is also designed to allow the valve assembly to be removed therefrom and replaced with a different valve assembly without loss of fluid media.

In one embodiment in accordance with the invention, a valved fitting is provided which includes a body having a first end and a second end spaced from the first end, with a fluid passage extending through the body between the first and second ends. A valve seat is defined on the body within the fluid passage, and a valve assembly is removably disposed within the fluid passage for controlling flow through the fluid passage. The valve assembly includes a valve head that is engageable with the valve seat in sealable relation therewith.

A higher flow area, and thus a higher flow rate, are achieved with the fitting of the invention as compared to conventional fittings which utilize a single-piece body with a Schrader valve, because the valve seat is defined on the body, and the valve head is engageable with the valve seat. Therefore, the flow area is determined by the flow passage of the body, and not by a Schrader valve housing. Further, the valve assembly is removable, thereby allowing the valve assembly to be replaced when needed.

In another embodiment in accordance with the present invention, a valved fitting for use with a service valve block having a housing is provided. The valved fitting includes a body having a first end adapted to be connected to the service valve block housing, and a second end spaced from the first end. A fluid passage extends through the body between the first and second ends, and a valve seat is defined on the body within the fluid passage. The body further includes an exterior surface that is adapted for connection with a fluid line. A valve assembly is removably disposed within the fluid passage for controlling flow through the fluid passage, and the valve assembly includes a valve head that is engageable with the valve seat in sealable relation therewith.

Since the flow area of the valved fitting of the invention is increased, a higher flow rate into or from the service valve block is achieved, so that charging, evacuation, or testing of the system with which the service valve block is used can be completed in a shorter amount of time. Further, the body is designed so that it can mate with all existing service connection tools, such as threaded connectors and latching connectors.

A variety of additional advantages of the invention will be set forth in part in the description which follows, and in part will be obvious from the description, or may be learned by practice of the invention. The advantages of the invention will be realized and attained by means of the elements and combinations particularly pointed out in the claims. It is to be understood that both the foregoing general description and the following detailed description are exemplary and explanatory only and are not restrictive of the invention as claimed.

BRIEF DESCRIPTION OF THE DRAWINGS

FIG. 1 illustrates a conventional service valve block with which the present invention can be used.

FIG. 2 is a detailed view of a conventional valved fitting used on the service valve block of FIG. 1.

FIG. 3 is a longitudinal cross-sectional view of the valved fitting in accordance with the present invention.

FIG. 3A is an end view of the spacer which is used to slideably support the valve stem.

FIG. 7 illustrates a latching connector on a fluid line which can connect with the valved fitting of the present invention.

FIGS. 8 and 8A illustrate possible configurations for the exterior surface of the first end of the first body member.

DETAILED DESCRIPTION OF THE PREFERRED EMBODIMENT

With reference now to FIG. 3, a valved fitting 30 in accordance with the present invention is illustrated in detail. The valved fitting 30 has particular use in connection with service valve blocks in air conditioning systems to permit charging, evacuation, and/or testing of the air conditioning system. However, the valved fitting 30 could be used in connection with other systems as well. The phrase "valved fitting" is meant to encompass fittings of the type described herein which permit charging, evacuation, and/or testing of a system.

Figure 4:
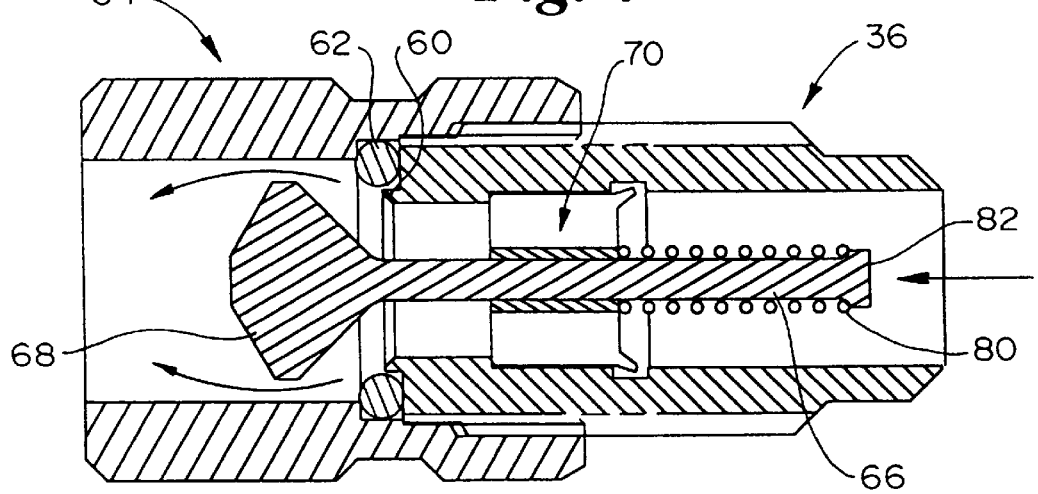
FIG. 4 is a view similar to FIG. 3, but with the valve assembly opened to illustrate the flow area.

The valved fitting 30 comprises a two-piece body 32 defining a flow path through which a fluid, such as a refrigerant, is able is flow, as can be seen in FIGS. 3 and 4. The two-piece body 32 includes a generally cylindrical, first body member 34 and a generally cylindrical, second body member 36 removably connected to the first body member 34. The first body member 34 has a first end 38 and a second end 40, and has a central fluid passage 42 defined by an interior wall 44 and extending between the two ends. The first end 38 is sized and shaped to be fixedly secured within a receptacle on a housing of a service valve block, such as by brazing or welding, whereby the valved fitting 30 is secured to the service valve block, while the second end 40 is adapted to be connected to the second body member 36. The interior wall 44 is stepped between the two ends 38,40 so as to define a large diameter region adjacent the second end 40 and a small diameter region adjacent the first end 38, with a shoulder 46 defined between the large and small diameter regions.

As can be seen in FIG. 3, a portion of the large diameter region of the interior wall 44 at the second end 40 is provided with threads 48. The second body member 36 has a diameter less than the diameter of the first body member 34, and includes a first end 50 disposed in the second end 40 of the first body member. Threads 52 are formed on the exterior surface of the second body member 36 for mating engagement with the threads 48, such that the first and second body members 34,36 are connected by a simple threaded engagement that allows the second body member 36 to be replaced when desired by simply unscrewing it from the first body member. A second end 54 of the body member 36 extends past the second end 40 of the body member 34, with the threads 52 also extending past the second end 40 toward the end 54. In order to allow flow through the body member 36, a central flow passage 56 extends between the two ends 50,54, and is parallel to the flow passage 42, with the flow passage 56 being defined by an interior wall 58.

The first end 50 of the body member 36 is further provided with a lip 60, and a seal 62 is disposed around the lip 60 and is supported thereby. As is shown in FIGS. 3 and 4, when the body member 36 is threaded into the body member 34, the seal 62 is disposed between the first end 50 and the shoulder 46 to prevent fluid leakage between the body members 34,36, and to capture the seal 62 to prevent seal blowout. The lip 60 and the seal 62 further form valve seats against which a valve assembly 64 engages to close off flow through the passages 42,56.

The valve assembly 64 is supported within the body member 36 so as to form a part thereof such that when the body member 36 is removed from the body member 34, the valve assembly is removed therewith. The valve assembly 64 includes an elongated valve stem 66 extending through the passage 56 parallel to the longitudinal axis thereof and a valve head 68 is secured to one end of the valve stem adjacent the first end 50 of the body member 36.

A spacer 70 is fixed within the flow passage 56 for slideably supporting the valve stem 66 to allow opening and closing movements of the valve assembly 64. The spacer 70 is best seen in FIGS. 3 and 3A and includes a central sleeve 72 through which the valve stem 66 extends, and a plurality of spacer arms 74 are circumferentially spaced around the sleeve 72 and extend to the interior wall 58 for supporting the central sleeve. There are preferably two or three of the spacer arms 74 in order to provide adequate support for the central sleeve 72. The spacer 70 can be fixed in the flow passage 56 in any suitable manner. In the preferred embodiment shown in FIG. 3, the interior wall 58 includes a circumferential groove 76, and the arms 74 are swaged 78 into the groove 76 so as to fix the spacer 70 within the flow passage 56. Alternatively, a snap-ring could be disposed in the groove to fix the spacer in the flow passage. The use of a snap-ring would eliminate the need to swag or deform the spacer arms.

A coil spring 80 surrounds the valve stem 66 and is engaged between the sleeve 72 and an enlarged end 82 of the valve stem so as to bias the valve stem 66 and valve head 68 to the right in FIG. 3 whereby the valve head is normally biased into sealed engagement with the seal 62, as well as with the lip 60 on the body member 36 to provide a metal to metal seal as a back-up to the seal 62. Thus, flow through the fitting 30 is prevented until the valve stem is biased to the left against the bias of the spring 80 which unseats the valve head. In the normally closed position of the valve assembly, the enlarged end 82 projects slightly beyond the end 54 of the body member 36, to facilitate actuation of the valve stem 66. However, the enlarged end 82 need not extend beyond the end 54 of the body member 36, but could instead be disposed completely within the body member 36.

The valved fitting 30 so far described provides a flow area many times greater than that of fittings with Schrader valves, thereby increasing the flow rate of fluid through the valved fitting 30. This can be seen from a comparison of FIGS. 2 and 4, where the relatively small size of the Schrader valve housing 28 limits the amount of flow that can flow through the fitting. The valved fitting 30 of the present invention however utilizes a two-piece body 34,36 construction in which larger flow passages can be formed to allow a larger flow rate through the fitting 30, in place of the single piece body 20 and Schrader housing of the prior art. Further, locating the seal 62 on the body member 36 rather than on the valve head provides a further increase in flow area and thus flow rate. Preferably, the valved fitting 30 has a flow area greater than about three times the flow area of a conventional fitting with a Schrader valve assembly. More preferably, the flow area of the fitting 30 is about three to about five times greater than the flow area of a conventional fitting with a Schrader valve assembly. Most preferably, the flow area of the fitting 30 is about four times greater than the flow area of a conventional fitting with a Schrader valve assembly.

The threaded connection between the body members 34,36 further permits the body member 36 and valve assembly 64 to be replaced as needed, by simply unscrewing the old body member and threading a new body member, complete with a valve assembly 64 therein, into the body member 34. Therefore, like the Schrader valve 24, the valve assembly 64 can be easily replaced should the valve assembly become defective.

Figure 5:
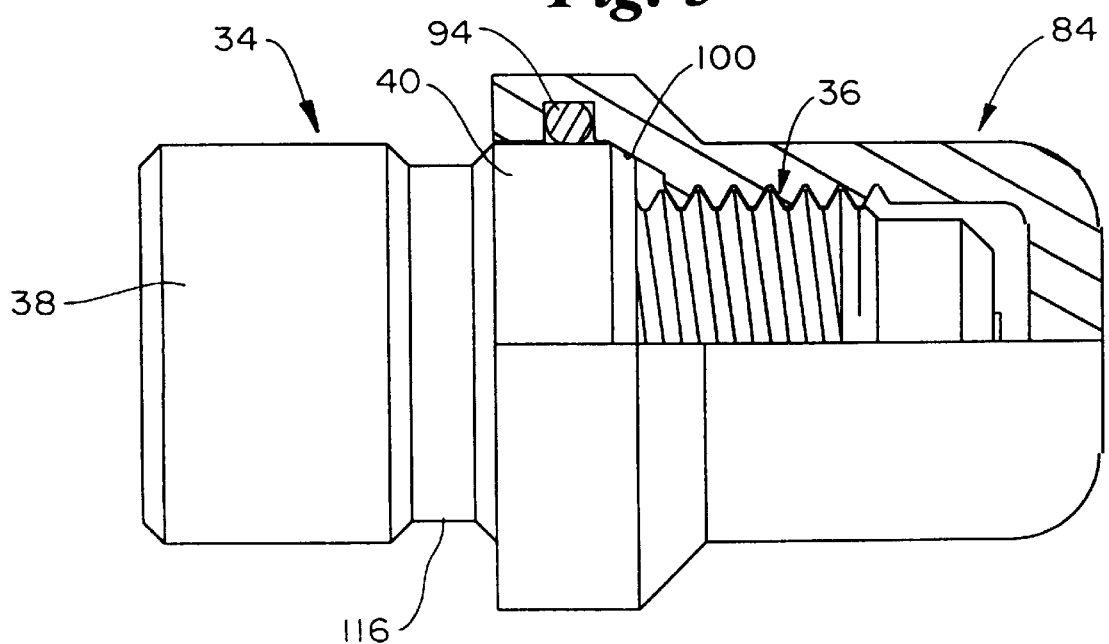
FIG. 5 illustrates the valved fitting of the present invention with a cap secured thereto.

When the valved fitting 30 is not in use, it is desirable to close off the fitting to further prevent fluid leakage, to protect the valve assembly components from foreign matter, and to prevent inadvertent actuation of the valve assembly 64. Therefore, the fitting 30 includes a cap 84 associated therewith for closing off the fitting. The cap 84 is generally cylindrical, and as shown in FIGS. 3 and 5, is hollow so as to be able to be fit over the second body member 36 as well as over the end 40 of the first body member 34. The cap 84 includes a smaller diameter portion 86 that is closed at one end and which is adapted to be disposed over the second body member 36, and a larger diameter portion 88 which is adapted to be disposed over the end 40 of the first body member 34 and which is connected to the portion 86 via angled portion 90.

The interior surface of the portion 86 is provided with threads 92 which mate with the threads 52 extending beyond the end 54 so that the cap 84 can be simply screwed onto the fitting 30. An elastomer seal 94 is disposed within a circumferential groove 96 on the interior surface of the portion 88, which seals with the outer surface of the end 40 of the first body member 34 when the cap is screwed onto the fitting 30, as can be seen in FIG. 5. The end 40 is further provided with an angled surface 98 which contacts an angled surface 100 on the angled portion 90 of the cap 84, as is shown in FIG. 5, to provide a metal to metal seal which further enhances the sealing capabilities of the cap 84.

Figure 6:
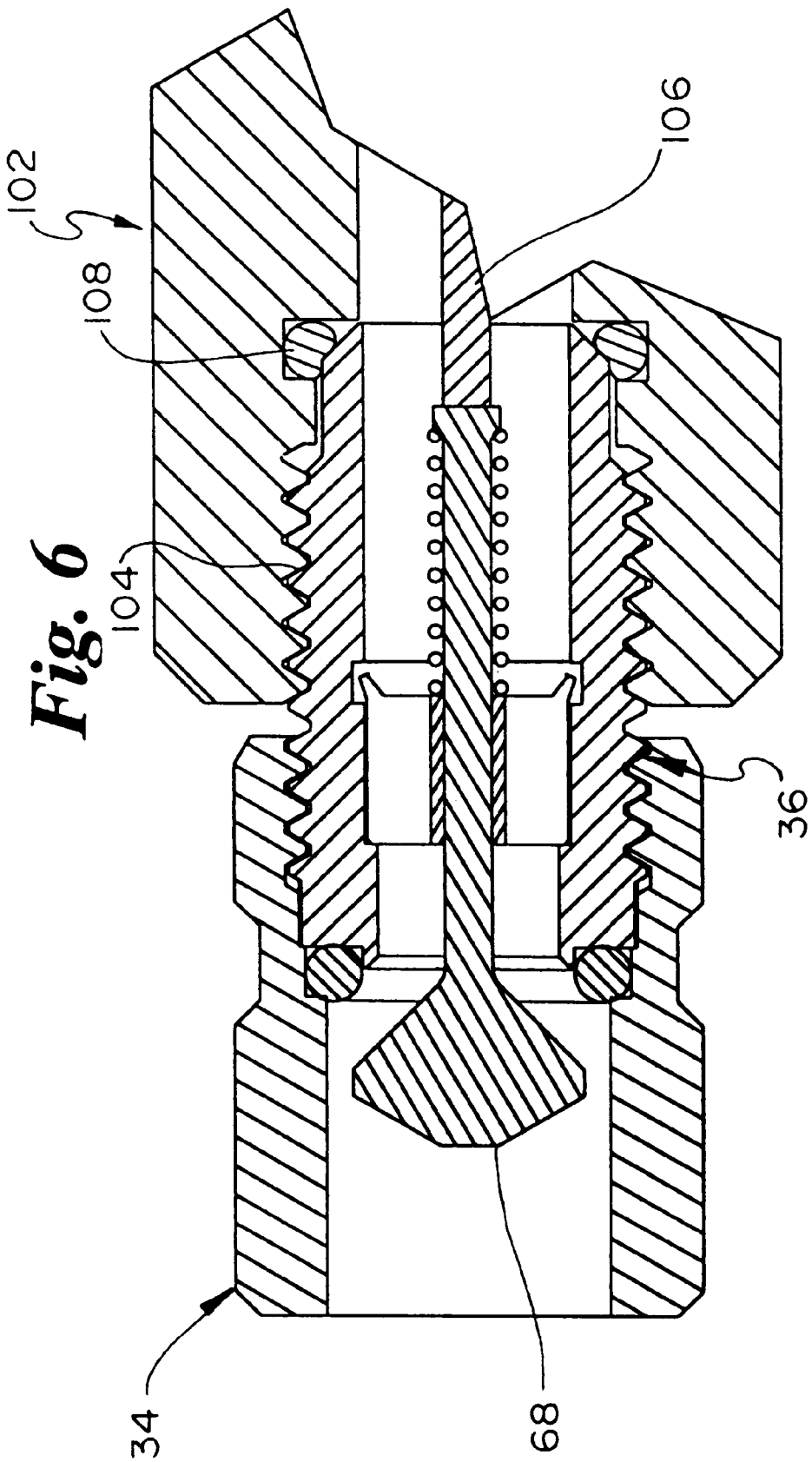
FIG. 6 illustrates the valved fitting of the present invention connected to a threaded fluid line.

When flow through the fitting 30 is desired, the cap 84 is removed, and the fitting 30 is connected with a fluid line which is designed to actuate the valve assembly 64 to allow flow through the fitting upon connection. With reference to FIG. 6, a first embodiment of a fluid line 102 is shown which is designed to be threaded onto the fitting 30. The fluid line 102 includes internal threads 104 which mate with the threads 52 on the second body member 36 that extend beyond the end 40 of the first body member 34, whereby the fluid line 102 is threaded onto the fitting 30. The fluid line 102 includes an actuating member 106, such as a pin or a valve, that is fixed therein which engages against the enlarged end 82 of the valve stem 66 when the fluid line is threaded onto the fitting so as to push the stem 66 to the left, against the bias of the spring 80, which unseats the valve head 68 to allow flow through the fitting 30. An elastomer seal 108 is disposed within the fluid line 102 and engages against the end 54 so as to seal the connection between the fitting and the fluid line. When the fluid line 102 is removed, the spring 80 biases the valve head back into sealing engagement with the seal 62.

FIG. 7 illustrates an alternate fluid line 102' that is provided with a latching connector 110 to allow quick connection to the fitting 30. Like the fluid line 102, the fluid line 102' includes an actuating member 106', such as a pin, valve, and the like, and an elastomer seal 108'. However, the latching connector 110 includes a generally cylindrical sleeve 112 that is axially slideable on the outer surface of the fluid line 102' as shown by the double headed arrow in FIG. 7. At least one detent ball 114 is disposed within a hole in the end of the fluid line 102' for locking engagement within a circumferential detent groove 116 formed in the outer surface of the first body member 34. The detent ball 114 is radially moveable within the hole, with its position controlled by the sliding movements of the sleeve 112.

The sleeve 112 includes an interior surface having a larger diameter portion 118, an angled ramp portion 120, and a smaller diameter portion 122. In the position of the sleeve shown in FIG. 7, the portion 118 is located above the ball 114, allowing the ball 114 to move radially outward in the hole, so that the fluid line 102' can be slid onto the fitting until the end 54 contacts the seal 108'. Once the end 54 contacts the seal 108', the ball 114 will be aligned with the detent groove 116, and further force applied to the sleeve 112 will cause the sleeve to slide to the left, so that the ramp portion 120 forces the ball down into its hole and into the detent groove 116. Locking is achieved by forcing the sleeve to the left until the small diameter portion 122 is located over the ball 114, thereby preventing radial movement of the ball and maintaining the connection until the sleeve is actuated back to the position shown in FIG. 7. Similar to the embodiment of FIG. 6, as the fluid line 102' is slid onto the fitting and locked in place by the latching connector 110, the actuating member 106' actuates the valve stem to unseat the valve head 68 and thereby permit flow through the fitting. Preferably, the end of the fluid line 102' includes an upturned lip 124 which limits movement of the sleeve to the left by contacting the ramp portion 120.

Thus, by providing a detent groove 116 on the first body member 34, quick connect latching connectors can be used to secure the fluid line to the fitting, which is much faster and physically less demanding than threading on a fluid line.

Although a single detent ball 114 has been described, a plurality of detent balls circumferentially spaced around the fluid line 102' could be used if desired.

With reference now to FIGS. 8 and 8A, the first body member 34 can be modified adjacent the end 38 thereof to facilitate assembly of the body members 34,36. As shown in FIG. 8, the body member 34 adjacent the end 38 can be hex-shaped, or as shown in FIG. 8A, the body member 34 can have flats 126. The hex-shape and flats 126 permit a tool, such as a wrench, to grip the body member 34 when threading the body member 36 into engagement therewith using another tool, to thereby ensure a tight connection between the body members 34,36. Further, since the end 38 of the body member 34 could be provided with a threaded extension for threading into the housing of the service valve block in order to secure the fitting thereto, the hex-shape and flats 126 would also facilitate securement/removal of the body member 34 to/from the valve block housing.

Figure 9:
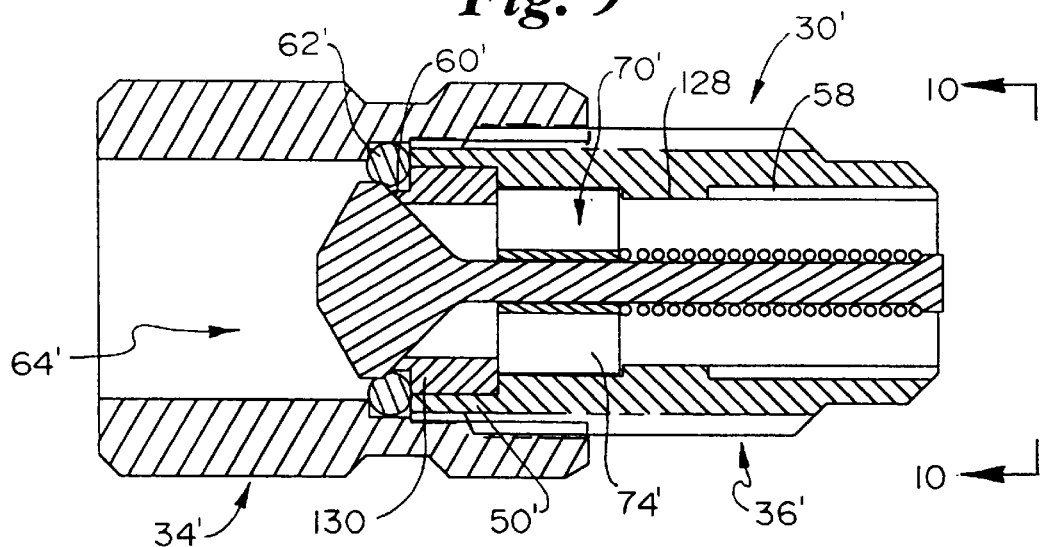
FIG. 9 is a view similar to FIG. 3, but showing an alternate embodiment of the valved fitting.

FIG. 9 illustrates an alternate embodiment of a valved fitting 30', in which elements similar to those in the valved fitting 30 are designated by the same reference numeral with a prime designation. However, instead of securing the spacer 70 in the passage 56 by swaging 78, the spacer 70' of the fitting 30' is secured in place without deforming the arms 74'. The interior wall 58' is instead formed with a circumferential shoulder 128, and the spacer 70' is slid into the end 50' of the body member 36' until the arms 74' contact the shoulder 128. A retaining ring 130 is then secured into the end 50', such as by a slip or press fit, so as to secure the spacer 70' in place. This construction makes it easier to assemble the body member 36' and valve assembly 64', since the arms 74' do not have to be swaged in order to secure the spacer. As can be seen in FIG. 9, the retaining ring 130 forms the lip 60' that supports the seal 62', and thus the retaining ring 130 can be considered as forming a portion of the second body member 36'.

Figure 10:
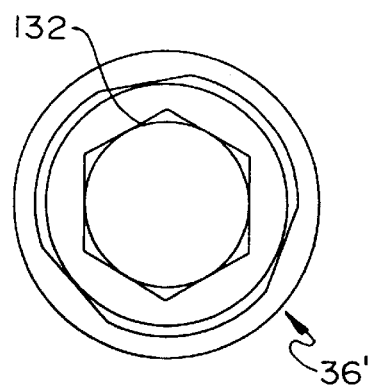
FIG. 10 is an end view of the valved fitting of FIG. 9, looking in the direction of line 10—10.

FIG. 10 illustrates how the body member 36' can be modified to facilitate connection and disconnection of the two body members 34',36'. Preferably, the interior wall 58' adjacent the end 54 of the body member 36' is shaped as a hex socket 132, so that a hex tool can fit into the socket 132 to aid in rotating the body member 36' during assembly or removal of the body member 36'. The hex socket 132 can also be used in connection with the embodiments of FIGS. 3–7.

Figure 11:
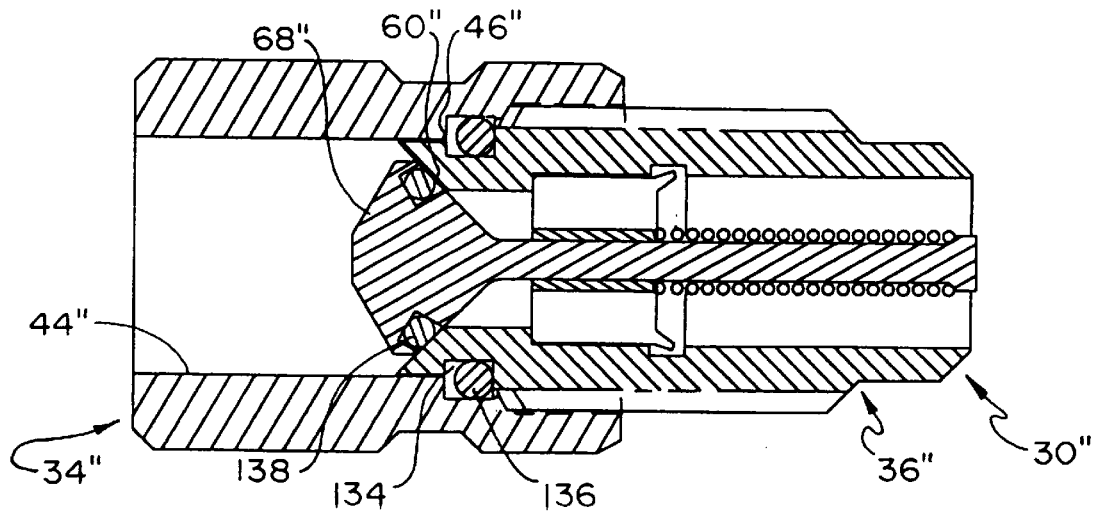
FIG. 11 illustrates yet another embodiment of the valved fitting.

FIG. 11 shows yet another alternate embodiment of a valved fitting 30" in accordance with the invention. The fitting 30" uses a dual sealing arrangement for sealing between the body members 34",36" and between the valve head 68" and the lip 60", instead of the single seal 62 in FIG. 3. In particular, the lip 60" is enlarged compared with the lip 60 and projects forward such that the outer surface of the lip is disposed closely adjacent the interior wall 44" of the body member 34" adjacent to the shoulder 46". A groove 134 is formed in the outer surface of the lip 60" and a seal 136 is disposed in the groove for preventing fluid leakage between the body members 34",36". A further seal 138 is disposed on the valve head 68" for sealing engagement with the forward face of the lip 60" to prevent fluid leakage between the valve head and the body member 36" interface. The seal 138 is preferably disposed within a groove formed in the valve head 68", and is secured within the groove in any suitable manner, such as with an adhesive, in order to prevent seal blowout.

Figure 12:
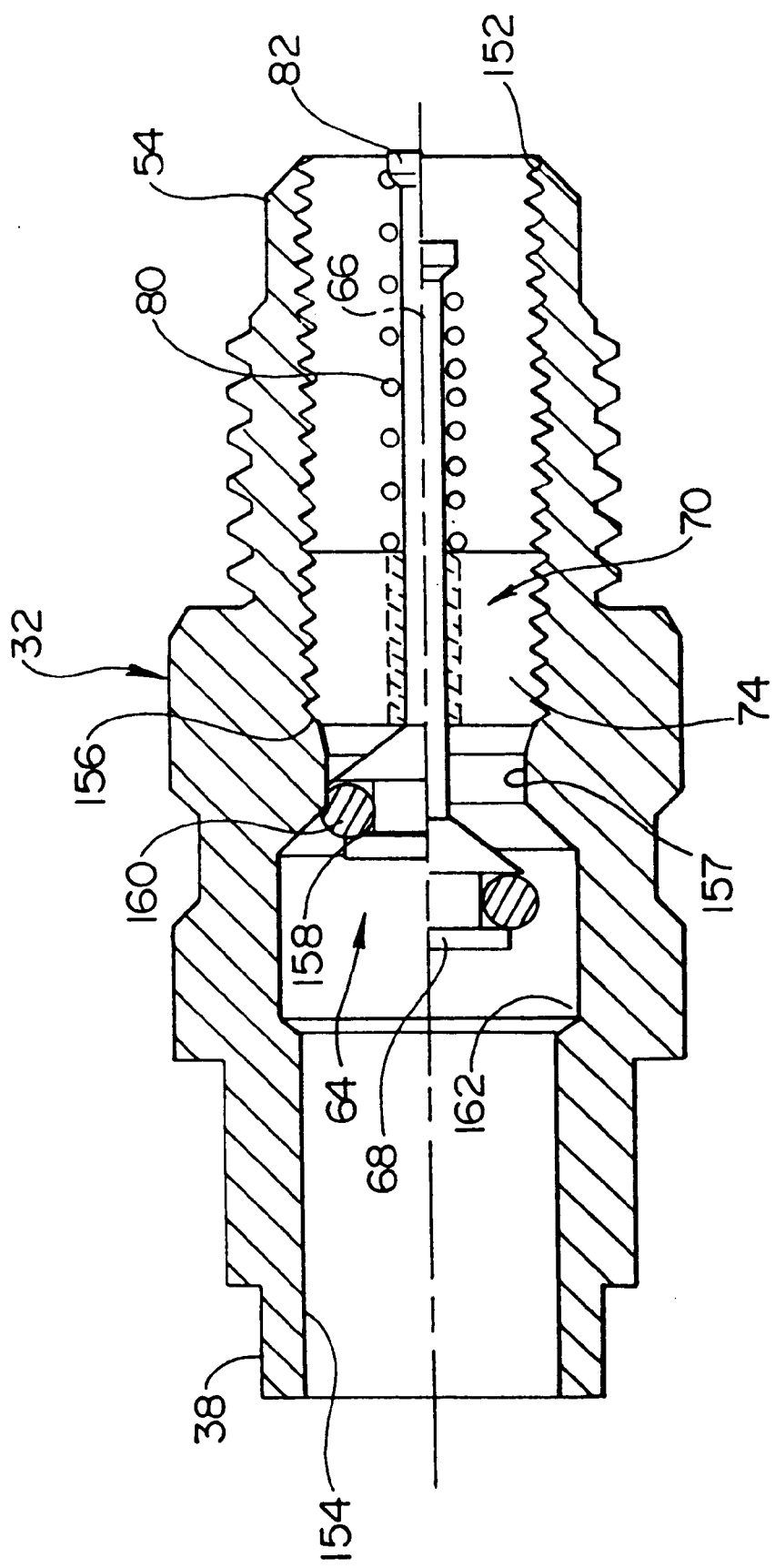
FIG. 12 is a longitudinal cross-sectional view of another valved fitting in accordance with the invention, having a one-piece body.

A valved fitting having an increased flow area in a one-piece body 32 is illustrated in FIG. 12. In this embodiment, the first and second body members 34,36 are integrated into a single piece, with the valve assembly 64 being supported within the one-piece body 32 for controlling flow therethrough. The spacer 70 in this embodiment is similar to the spacer used in the embodiment of FIGS. 3 and 3A, however the ends of the arms 74 are formed with threads, which engage with threads 152 formed on the interior wall 154 of the one-piece body 32. Thus, the valve assembly 64 can be removed from the one-piece body and replaced with a new valve assembly as needed by simply unscrewing the spacer 70. Although the use of threads are shown and described as detachably securing the valve assembly within the one-piece body, other detachable securement means could be used instead of threads. In addition, in case the valve assembly does not need to be made removable, the valve assembly 64 could be secured within the one-piece body 32 by swaging the arms 74, or by using a press or slip fit and retaining ring arrangement, similar to that shown in FIG. 9, or by using other desired securement means.

A shoulder 156 formed on the interior wall 154 defines a stop for the arms 74, thereby stopping the valve assembly at the fully inserted position. The interior wall 154 further includes a reduced diameter valve seat portion 157 having an inner diameter slightly greater than the largest outer diameter of the valve head 68 of the valve assembly, to permit removal of the valve assembly. The valve head 68 further includes a radially outward facing groove 158 formed therein, and a seal 160 is disposed in the groove 158 for sealing engagement with the valve seat portion 157 when the valve head is biased by the spring 80 to the right, as shown in the top half of FIG. 12. The seal 160 is preferably secured within the groove 158 in any suitable manner to prevent seal blowout. Upon connection with a fluid line, which actuates the valve stem 66 and valve head 68 to the left, the seal 160 unseats from the valve seat portion 157 and flow is permitted, as shown in the bottom half of FIG. 12. In order to increase the flow area even further, the interior wall 154 is formed with a recessed portion 162 adjacent the valve seat portion 157 downstream therefrom. When the valve head 68 is unseated, the recessed portion will be located radially outward from the valve head, so that the flow area for the fluid is further increased.

The one-piece body design of FIG. 12 provides an increased flow area, and thus increased flow, when compared with fittings utilizing a Schrader valve assembly. As is shown in FIG. 2, the flow area of the fitting is limited due to the fact that all fluid must flow through the Schrader valve housing 28, and since the valve head 29 of the Schrader valve 24 seals with the valve housing 28 to close off flow through the fitting 18. The valved fitting design of FIG. 12, however, eliminates the housing and the valve head 68 engages with the interior wall 154 of the one-piece body 32. Therefore, the flow area available to the fluid is increased, since the flow area is limited by the interior wall of the one-piece body, and not a housing for the valve assembly.

The valved fitting of the invention provides a flow area which is many times greater than that of fittings that use a Schrader valve assembly, with the valved fitting of the invention having the same overall size as previous fittings. Further, the ability to replace the valve assembly, without loss of fluid, is maintained. The valved fitting of the invention is also specifically designed to allow connection to a fluid line by a quick connect latching connector, so that connections can be made much faster and with less physical exertion. However, the fitting can also be connected with a threaded fluid line, so that the valved fitting of the invention can be connected in a variety of ways to fluid lines.

Further, although a specific prior art service valve block has been illustrated in FIG. 1, it is to be realized that the valved fitting of the present invention can be used with a variety of different service valve blocks, in addition to the service valve block that is illustrated.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A valved fitting, comprising:

a first body member having a first end, a second end and a first flow passage extending between the first and second ends;

a second body member having a first end, a second end and a second flow passage extending between the first and second ends thereof; the first end of said second body member being detachably connected to said first body member adjacent the second end of said first body member whereby said second body member is disconnectable from said first body member, and the first flow passage is aligned with the second flow passage, and the second end of said second body member extends past the second end of said first body member; and a valve assembly secured to said second body member whereby said valve assembly is removable together with said second body member from said first body member, said valve assembly including a valve head and a valve stem, said valve head is disposed adjacent the first end of said second body member, and said valve stem is disposed within said second flow passage and has a first end connected to said valve head and a second end positioned to be engaged by an actuating member of a connector.

2. The valved fitting according to claim 1, wherein the second end of said valve stem is disposed adjacent the second end of said second body member.

3. The valved fitting according to claim 1, wherein the first end of said second body member is detachably connected to said first body member via threads.

4. The valved fitting according to claim 1, wherein the first end of said second body member is detachably connected to said first body member within said first flow passage, and said valve head is engageable with a valve seat that is located adjacent the first end of said second body member.

5. The valved fitting according to claim 4, wherein said valve seat comprises a lip formed at the first end of said second body member.

6. The valved fitting according to claim 5, wherein said valve seat further comprises an o-ring seal surrounding said lip.

7. The valved fitting according to claim 1, wherein an exterior surface of said second body member includes means permitting connection of a fluid line connector to the valved fitting.

8. The valved fitting according to claim 7, wherein said means permitting connection comprises threads.

9. The valved fitting according to claim 8, further including a cap engageable with said threads, said cap is adapted to cover the second end of said second body member and surround the second end of said first body member, and said cap is adapted to form at least one seal with said first body member.

10. The valved fitting according to claim 9, wherein said cap is adapted to form two seals with said first body member, one of said seals comprises an elastomeric seal and the other said seal comprises a metal-to-metal seal.

11. The valved fitting according to claim 1, wherein an exterior surface of said first body member includes means permitting connection of a fluid line connector to the valved fitting.

12. The valved fitting according to claim 11, wherein said means permitting connection comprises a circumferential detent groove.

13. The valved fitting according to claim 1, wherein said valve head is biased toward the first end of said second body member.

14. The valved fitting according to claim 1, further including a spacer within the second flow passage, said spacer slidably supporting said valve stem.

15. The valved fitting according to claim 1, wherein the first end of said first body member is adapted for connection to a housing of a service valve block.

16. The valved fitting according to claim 1, further including a seal for sealing between the first and second body members, said seal being removable with the second body member.

17. The valved fitting according to claim 16, wherein the valve head is engageable with the seal.

18. A valved fitting comprising:

a one-piece body having a first end and a second end, and an interior wall defining a flow passage between the first and second ends, and said interior wall including a reduced diameter portion forming a valve seat;

a valve assembly removably secured within the flow passage for controlling flow therethrough, said valve assembly including a spacer that is non-destructively detachably connected to said interior wall, a valve stem slidably supported by said spacer, and a valve head connected to an end of said valve stem, the valve head having an outer diameter that is less than an inner diameter of the reduced diameter portion; and a seal disposed on the valve head, said seal being engageable with said valve seat on said interior wall of said one-piece body, and wherein said valve head contacts said spacer when said seal is engaged with said valve seat whereby said spacer acts as a stop for said valve head.

19. The valved fitting according to claim 18, wherein said spacer includes a plurality of arms, said arms having threads that engage with threads formed on said interior wall.

20. The valved fitting according to claim 18, wherein the valve head includes a radial groove, and said seal is secured within said groove.

21. The valved fitting according to claim 18, wherein said spacer, said stem, said valve head and said seal are removable together as a single unit from the one-piece body.

* * * * *